United States Patent

Thompson

[15] 3,657,996
[45] Apr. 25, 1972

[54] BARBECUE

[72] Inventor: Orla Denley Thompson, 40 Owen Boulevard, Willowdale, Ontario, Canada

[22] Filed: Jan. 29, 1970

[21] Appl. No.: 6,731

Related U.S. Application Data

[63] Continuation-in-part of Ser. No. 841,020, July 11, 1969.

[52] U.S. Cl. ............................. 99/443 R, 99/395, 99/444, 126/25
[51] Int. Cl. ......................................................... A47j 37/04
[58] Field of Search ............... 99/446, 443, 444, 447, 450, 99/423; 126/25; 99/395

[56] References Cited

UNITED STATES PATENTS

| 2,819,667 | 1/1958 | Victor | 99/339 |
| 3,033,189 | 5/1962 | Clark | 99/443 R X |
| 3,085,497 | 4/1963 | Statia | 99/340 |
| 3,217,634 | 11/1965 | Fox | 99/339 |
| 3,298,301 | 1/1967 | Lowndes | 99/340 |

*Primary Examiner*—Walter A. Scheel
*Assistant Examiner*—Arthur O. Henderson
*Attorney*—Fetherstonhaugh & Co.

[57] ABSTRACT

This invention relates to a barbecue that has a rotatably mounted grill for holding the foods in which a device is provided for preventing the travel of liquid fat beyond the outer peripheral edge of the barbecue as the grill is rotated.

2 Claims, 9 Drawing Figures

PATENTED APR 25 1972 3,657,996

INVENTOR
ORLA D. THOMPSON
BY Fetherstonhaugh & Co.
ATTORNEYS

PATENTED APR 25 1972

*INVENTOR.*
ORLA D. THOMPSON

BY *Fetherstonhaugh & Co.*

ATTORNEYS 3,657,996

BARBECUE

This application is a continuation-in-part of application Ser. No. 841,020, filed July 11, 1969.

FIELD OF INVENTION

This invention relates to devices for barbecuing meats and is particularly concerned with the small "pan" type outdoor barbecue which essentially consists of a shallow pan for holding charcoal and a screen-like grill on which meat is supported above the glowing charcoal.

PRIOR ART

The chief operating difficulty of the above type of barbecue is that as the melted fat dripping from the meat being cooked falls into the burning charcoal, it tends to flare up. If this tendency is not keep under control, the meat can be so severely burned as to be unusable. Accordingly, it is usual when barbecuing meats, particularly those of the fatty variety, to trim off all excess fat before placing the meat on the barbecue. Further, most barbecues are provided with means for adjusting the height of the grill above the charcoal and while this feature is provided to accommodate variations in the heat given off by the charcoal, it is also used to raise the meat when the dripping fat is causing extreme flare-ups.

However, some people prefer not to trim off the excess fat as they consider doing so is a waste or they particularly enjoy the fatty portions of meat. There is no effective control for this condition other than moving the steak or extinguishing the flare-up with water. Moving the steak is inconvenient or impossible if one has a full grill. Water, while effective, retards cooking.

In view of the above, it is the chief object of this invention to provide a horizontal type of barbecue which includes means for preventing flare-ups caused by dripping fat and which is operative without the need to trim excess fat from the meat or to raise the meat above the charcoal to an unusual degree.

It is a more specific object of the invention to provide a barbecue which reduces dripping fat flare-ups on the meat by means for leading the fat coming off the meat to the outer perimeter of the charcoal pan.

SUMMARY

A barbecue according to the invention consists of a pan for holding charcoal or other fuel and a grill rotatably mounted above the pan, the grill being rotatable at a speed to centrifugally urge liquid fats thereon to its outer edge and the barbecue having the improvement of a means for preventing the travel of liquid fat beyond the outer peripheral edge of the pan as the grill is rotated.

The invention will be more thoroughly understood from the following description of several preferred embodiments thereof as read in conjunction with the accompanying drawings.

PREFERRED EMBODIMENT

Figure 1:
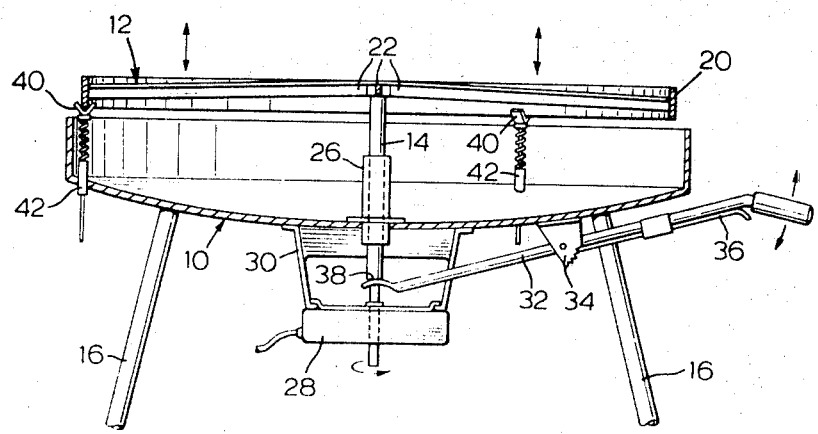
FIG. 1 is a front elevation view, partly in section, of a first preferred embodiment of the barbecue in accordance with the invention.

Referring to FIG. 1, the barbecue of the first embodiment of the invention essentially consists of a shallow pan 10 for holding charcoal or other fuels normally used in such devices and a grill 12 carried on a center post 14. The pan can be made of any material capable of holding a burning charcoal bed, preferably steel. It is supported by three or more tubular steel legs 16. In this regard, however, it should be understood that the pan for holding the burning charcoal could be part of a permanent structure formed of bricks or the like and that the invention is not restricted to the particular type of "portable" barbecue shown in FIG. 1.

Figure 2:
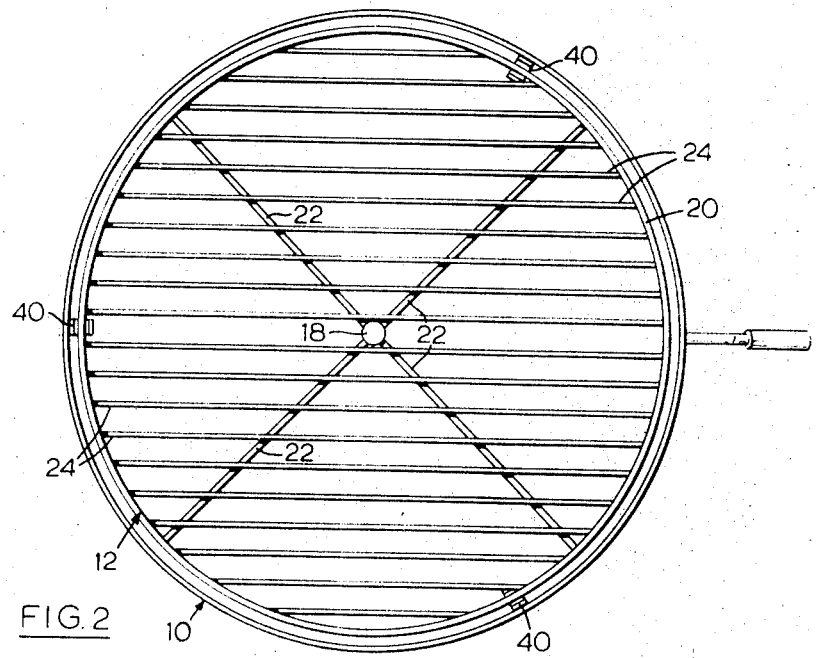
FIG. 2 is a top plan view of the barbecue shown in FIG. 1.

As can best be seen in FIG. 2, grill 12 is circular in shape and is made up of a central hub 18 connected to a peripheral ring 20 by four radially extending struts 22. The struts support a grid of wires 24. The struts and the grid wires are sloped downwardly from the hub to the outer periphery of the grill, as can best be seen in FIG. 1.

The grill is carried by the center post 14 which is mounted for rotation in a bearing-like tubular element 26 positioned at the center of pan 10. At its upper end where it is supported by bearing 26, shaft 14 is round but at its lower end it is square in cross section for connection to an electric motor 28. The latter is supported by and fixed to the underside of pan 10 by a bracket 30.

From the foregoing, it will be appreciated that grill 12 is rotatable and that motor 28 constitutes a means for rotating the grill. This rotatable feature of the grill is an important feature of the invention as is explained in greater detail hereinafter.

Means is also provided for raising and lowering the grill relative to the pan. This feature is common to most barbecues of this type and it consists of a lever 32 pivotally mounted on a bracket 34 fixed to the underside of the pan. The bracket carries a toothed lower edge whereby the grill may be held at any selected vertical position by means of a spring biased elongated dog 36. At its inner end, lever 32 is forked and bears against the underside of a shoulder 38 on shaft 14. This arrangement takes into account the fact that shaft 14 rotates.

Although not essential, it is preferable that motor 28 be a variable speed motor so that the rate of rotation of the grill may be adjusted. In any case, due to the rotation of the grill and the downward sloping of the wire components of the grill and struts 22, melting fat which would normally drop directly into the center area of the burning charcoal is carried by centrifugal force outwardly to the peripheral outer ring 20 of the grill. Thus, by the expedient of the rotating grill, flare-ups resulting from fat dripping into the center of the pan are minimized. For beef of average fat content, the grill is rotated about 40 r.p.m.'s, the speed being varied as required for other meats.

Figure 4:
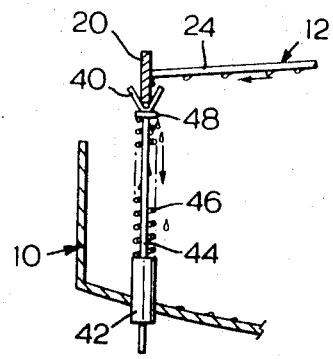
FIG. 4 is an enlarged detail view of one side edge of the barbecue shown in FIG. 1.

In order to prevent the melted fat from flying outwardly from the outer periphery of the grill as the result of the rotation of the grill, a number of wiping devices are positioned to wipe the lower edge of ring 20. These devices comprise spring biased V-shaped fibrous wipers 40 carried in bearing-like tubes 42 fixed to the bottom wall of the pan. This wiper arrangement is shown in greater detail in FIG. 4 from which it can be seen that the wipers 40 are each carried by rods 44 which are capable of vertical sliding movement in tubes 42. A coil spring 46 is compressed between the upper end of tube 42 and a washer 48 positioned immediately beneath wiper 40 to exert a wiping tension. FIG. 4 also shows the path taken by melted fat as it moves outwardly under centrifugal force along wires 24 to ring 20 where the fat is wiped from the lower edge of the ring and falls into the pan at the outer edge. From this point, the fat moves towards the center of the pan by virtue of the curved lower wall of the pan but it burns at a slow rate and in an even fashion as it progresses towards the center of the pan, i.e. there is no tendency for flare-ups occurring in the center of the barbecue. Even should flare-ups occur where the fat drips into the pan after being wiped from the lower edge of ring 20, the flare-ups occur towards the outer edge of the pan, i.e. radially outward of the meat being broiled.

Figure 3:
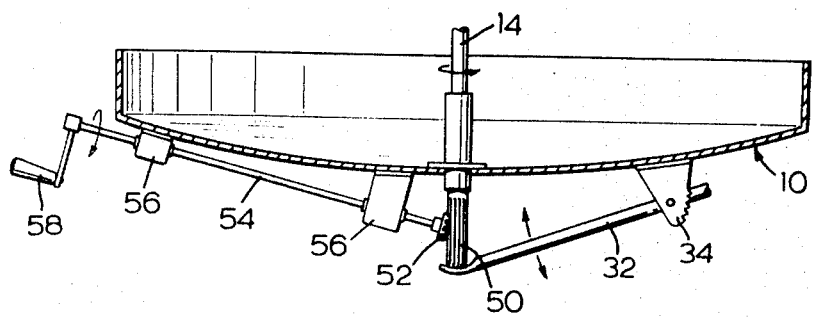
FIG. 3 is a front elevation view, partly in section, of the pan and center post of a barbecue in accordance with a second preferred embodiment of 1; invention.

The embodiment illustrated in FIG. 3 differs from the embodiment already described only in the substitution of a manually operated means for rotating the grill in lieu of the motor arrangement shown in FIG. 1. For the manual rotation arrangement, the lower end of shaft 14 is provided with elongated gear teeth 50 which mesh with a ring gear 52 carried at the inner end of a rotatable rod 54 supported by a pair of brackets 56 attached to the underside of the pan. A crank handle 58 is fixed to the other end of the rod. As a further modification, the inner end of the height adjusting lever 32 bears against the lower end of shaft 14.

Figure 5:
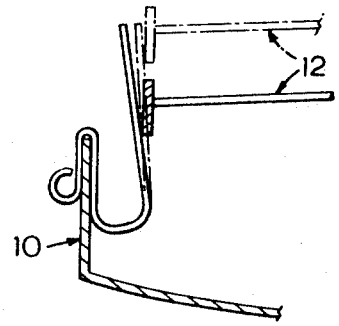
FIG. 5 is a view similar to FIG. 4 but showing a modified form of the arrangement for preventing melted fat from flying off the outer edge of the grill as it is rotated.

FIG. 5 shows a modified form of wiping arrangement for wiping ring 20. This consists of one or more clip-like devices fixed to the outer wall of pan 10 and which bear against the ring 20 regardless of the height of the grill.

The means for rotating the grill is not of basic importance. The essential thing is that it be rotatable to hurl the fat outwardly and that the barbecue includes means for preventing the fat from travelling beyond the peripheral edge of the barbecue pan as the grill is rotated. In the embodiments previously described, this means may consist of a number of wiping devices which are used to wipe the fat from the edge of the grill and to direct the fat downwardly into the pan to prevent it from being thrown beyond the peripheral edge of the barbecue. An alternative method of achieving this result is illustrated in FIGS. 6 and 7.

Figure 6:
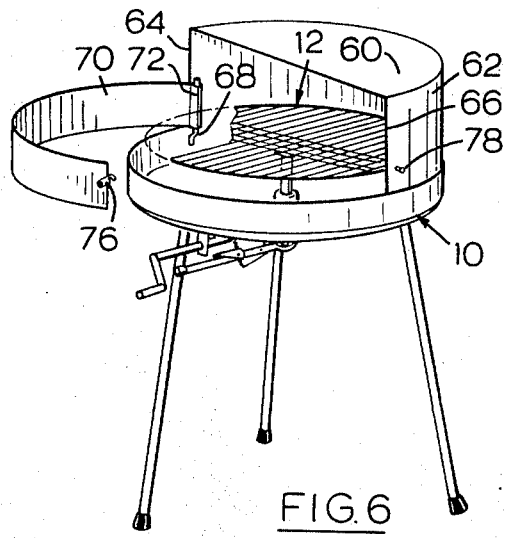
FIG. 6 is a pictorial view of a hooded barbecue having a pivotally mounted fat catching gate.

In FIG. 6 of the drawings, a hood 60 of a conventional type is mounted within the pan 10. Hood 60 has a semicircular wall 62 which extends around substantially 180° of the pan and terminates in vertical side edges 64 and 66. A pivot pin 68 has its lower end welded to the inner wall of the pan 10 and extends inwardly and upwardly therefrom. A major portion of the length of the upper end of the pin is vertically extending. The pin 68 is secured to the pan 10 in such a way that the lower end of the upper vertically extending portion is disposed below the upper peripheral edge of the pan 10. A releasable fat catching gate 70 is folded upon itself at one end to form a sleeve 72 which is adapted to fit over the vertically extending portion of the pin 68. The vertically extending portion of the pin 68 is spaced inwardly from the inner edge of the pan 10 a distance which is at least equal to the thickness of the gate 70. A small latch 76 is pivotally mounted at the other vertically extending edge of the gate 70 and is formed with a latch opening adapted to fit over a locking pin 78 which is secured to the outer surface of the hood 60. The gate 70 is adapted to pivot between the open position which is shown in FIG. 1 and a closed position wherein the lower curved edge thereof fits within the inner wall of the pan 10. It will be seen that when the gate 70 moves into this closed position, it must pass over r the upper edge of the pan 10 but when it is located in the closed position, it will drop into position in the pan by sliding vertically on the pivot pin 68 to locate the lower curved edge below the level of the upper edge of the pan. The latch 76 is then moved into engagement with the pin 78 to lock the gate in the closed position. By ensuring that the inner edge of the gate is located within and below the level of the upper edge of the pan, any fat which is thrown onto the inner surface of the guard will drop down into the pan and will not spill over the outer surface of the pan 10. The releasable gate provides a convenient means whereby access is provided to the coals without removing the grill.

Figure 7:
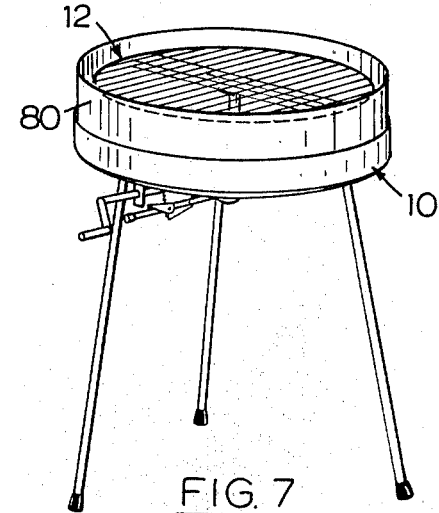
FIG. 7 is a pictorial view similar to FIG. 1 showing a barbecue having a circumferentially extending fat catching collar.

A modified form of the invention illustrated in FIG. 6 is shown in FIG. 7 wherein the means for directing the centrifugally urged liquid fats downwardly into the pan consists of a sleeve 80 which is adapted to fit within the open upper end of the pan 10. The sleeve has a sufficient vertical height to permit the grill 12 to be rotated at various levels above the coals while preventing the centrifugally outwardly directed fats from spilling over the edge of the pan 10. The sleeve 80 is adapted to fit freely within the pan 10 so as to be easily removed to provide access to the coals when the barbecue is in use.

Figure 8:
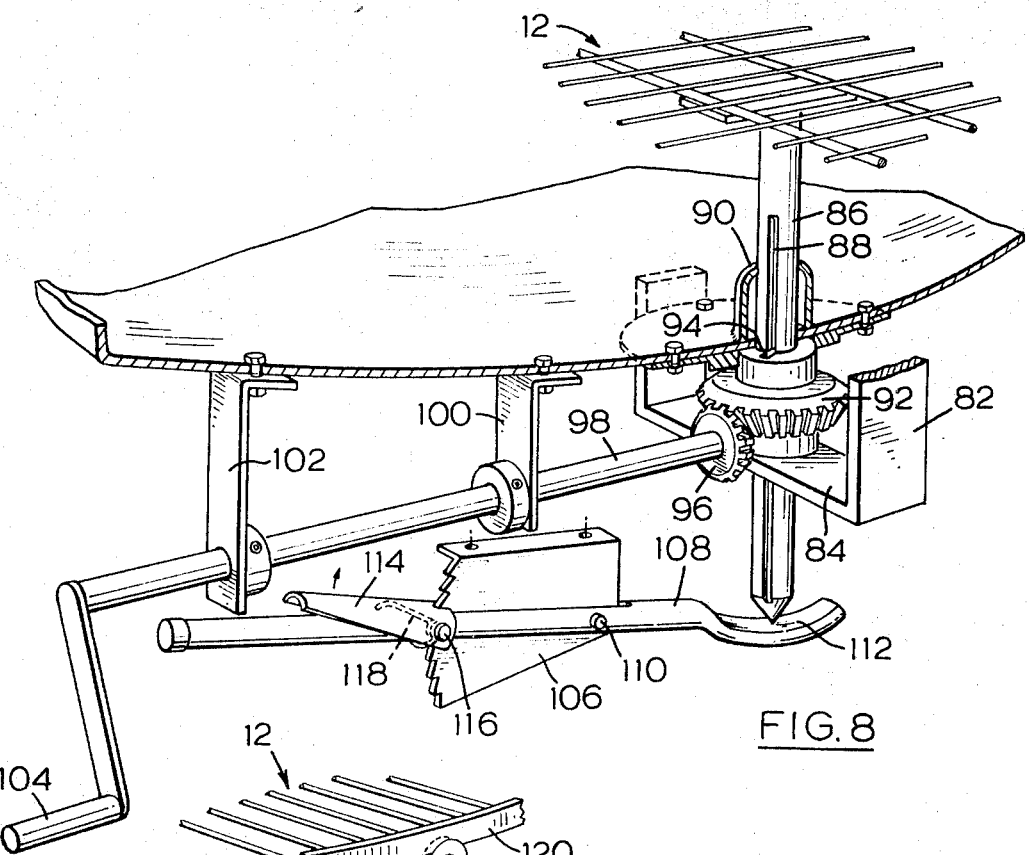
FIG. 8 is an enlarged detailed view of an alternative means for manually rotating and elevating the grill.

An alternative form of manually operable rotary drive arrangement is illustrated in FIG. 8 of the drawings. In this embodiment, a U-shaped bracket 82 is secured to the underside of the pan 10 by welding. The bracket 82 has a horizontally extending bar portion 84 which has a circular opening formed therein (not shown) in axial alignment with the shaft 86 of the grill. The shaft 86 of the grill has a longitudinally extending keyway 88 formed therein. The shaft 86 is adapted to extend vertically downwardly through a conventional cap 90 and through the opening formed in the horizontally extending bar 84 of the U-shaped bracket 82. A bevelled gear 92 is adapted to slidably receive the shaft 86 and is formed with a key 94 which slidably engages the keyway 88 of the shaft. The key 94 drivingly engages the bevelled gear 92 and the shaft 86 while permitting vertical movement of the shaft 86 relative to the gear 92. The bevelled gear 92 is rotatably driven by a smaller bevelled gear 96 which is rigidly mounted on a shaft 98. The shaft 98 is rotatably mounted in brackets 100 and 102 which are secured to the pan 10 at their upper end and which extend vertically downwardly therefrom. A crank handle 104 is provided at the outer end of the shaft 98. It will be seen that rotation of the crank handle 104 will rotatably drive the gear 92 which will in turn drive the shaft 86 and the grill 12 which is supported thereby.

In this embodiment, the means which is provided for raising and lowering the grill relative to the pan consists of the bracket 106 which is secured to the underside of the pan. It will be understood that for clarity of illustration, a portion of the pan has been broken away in FIG. 8 of the drawing. The bracket 106 is secured to the pan in a manner similar to that shown in FIG. 3. A lever 108 is pivotally mounted by means of a pivot pin 110 to the bracket 106. The inner end of the lever 108 is located under the pointed lower end of the shaft 86. The inner end 112 of the lever 108 is suitably curved to receive the pointed lower end of the shaft 86. The outer end of the lever 108 extends outwardly from the edge of the pan and has a releasable catch 114 pivotally mounted thereon by means of the pivot pin 116. The catch 114 has an inner edge which is adapted to enter into cooperative locking engagement with the serrated outer edge of the bracket 106. A small spring 118 serves to urge the catch 114 into the locking engagement. The height of the shaft can be adjusted by releasing the catch 114 by pivoting it about pivot pin 116 to disengage the serrated edge of the bracket 106 and pivoting the shaft about the pivot pin 110 to any one of the several positions provided by the serrated edge of the bracket 106.

Figure 9:
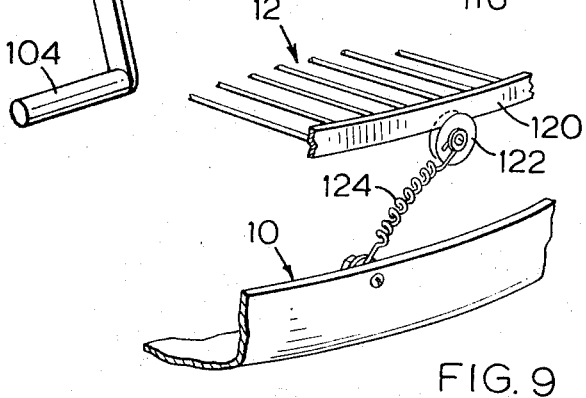
FIG. 9 is a partial pictorial view of an alternative form of wiper for removing the fat from the edge of the grill.

A further form of wiping device is illustrated in FIG. 9 of the drawings. In this embodiment, the rail 120 which is located at the outer edge of the grill 12 is engaged by a roller 122. The roller 122 has a suitable recess at its peripheral edge to receive the lower edge of the rail 120. The roller 122 is rotatably carried at the upper end of a coil spring 124. The lower end of the coil spring 124 is secured to the inner wall of the pan 10 by a suitable clamping means. The spring 124 normally urges the roller to a position vertically above the clamping means but in use the roller 122 is operatively retained in an oblique position by the head rail 120. The angular disposition of the spring 124 will depend upon the height at which the grill 12 is located in use. If required, the grill may be lowered below the position illustrated in FIG. 9 and the wiper wheel 122 will move downwardly with the guide rail 120. Similarly, the grill 12 may be elevated to a position wherein the spring 124 extends substantially vertically upwardly from the pan. Normally the spring would not reach the vertical position until the grill is lifted to a height above the maximum height at which it may be rotatably driven.

What I claim as my invention is:

1. A barbecue comprising a pan for holding charcoal or other fuel, a rotatably mounted grill positioned above the pan and disposed to hold foods upon it, drive means operable to rotate said grill at a speed to centrifugally urge liquid fats thereon to its outer edge, and means adjacent the edge of said grill for directing the centrifugally urged liquid fats downwardly into said pan, said latter means comprising a vertically oriented guard means above the pan and extending around said grill in spaced relationship to the outer edge thereof, said guard means projecting upwardly to a height above the height of the grill.

2. A barbecue as claimed in claim 1, in which said grill comprises a central hub, a plurality of radially extending struts, a plurality of wire elements supported by said struts, and the struts and wire elements sloping downwardly from said hub toward said guard means.

* * * * *